(12) United States Patent  (10) Patent No.: US 7,466,042 B2
Eldredge  (45) Date of Patent: Dec. 16, 2008

(54) UNIVERSAL DC POWER

(75) Inventor: James G. Eldredge, Meridian, ID (US)

(73) Assignee: Flexsil, Inc., Meridian, ID (US)

( * ) Notice: Subject to any disclaimer, the term of this patent is extended or adjusted under 35 U.S.C. 154(b) by 339 days.

(21) Appl. No.: 11/101,036

(22) Filed: Apr. 6, 2005

(65) Prior Publication Data
US 2006/0226712 A1 Oct. 12, 2006

(51) Int. Cl.
G01R 1/20 (2006.01)
H02J 7/00 (2006.01)
(52) U.S. Cl. ........................ 307/154; 320/106
(58) Field of Classification Search ................. 307/154
See application file for complete search history.

(56) References Cited

U.S. PATENT DOCUMENTS

| | | | | |
|---|---|---|---|---|
| 4,065,713 A | * | 12/1977 | Pollmeier | 363/19 |
| 5,111,058 A | * | 5/1992 | Martin | 307/66 |
| 5,347,211 A | | 9/1994 | Jakubowski | 323/351 |
| 5,397,929 A | | 3/1995 | Hogarth et al. | |
| 5,477,091 A | | 12/1995 | Fiorina et al. | |
| 5,576,940 A | | 11/1996 | Steigerwald et al. | |
| 5,606,242 A | * | 2/1997 | Hull et al. | 320/106 |
| 5,684,451 A | | 11/1997 | Seberger et al. | 340/310.06 |
| 5,842,027 A | * | 11/1998 | Oprescu et al. | 713/300 |
| 5,900,684 A | | 5/1999 | Lam | |
| 6,058,034 A | | 5/2000 | Cummings et al. | |
| 6,061,261 A | | 5/2000 | Chen et al. | |
| 6,064,177 A | | 5/2000 | Dixon | 320/111 |
| 6,115,468 A | | 9/2000 | De Nicolo | 379/413 |
| 6,160,728 A | | 12/2000 | Peterson et al. | |
| 6,643,158 B2 | | 11/2003 | McDonald et al. | 363/142 |
| 6,724,588 B1 | * | 4/2004 | Cummings et al. | 361/18 |
| 6,804,351 B1 | * | 10/2004 | Karam | 379/413 |
| 6,936,936 B2 | * | 8/2005 | Fischer et al. | 307/151 |
| 6,980,122 B2 | | 12/2005 | Novikov | |

(Continued)

FOREIGN PATENT DOCUMENTS

EP 1450461 8/2004

(Continued)

OTHER PUBLICATIONS

Templeton, Brad, "Brad Ideas: I Want Universal DC Power", 4 pgs., Jan. 26, 2004.

Primary Examiner—Michael J Sherry
Assistant Examiner—Hal I Kaplan
(74) Attorney, Agent, or Firm—Stolowitz Ford Cowger LLP

(57) ABSTRACT

A power converter capable of providing a range of DC voltages to an external device and a method of providing a range of DC power are provided. The power converter comprises a supply circuit for receiving a request for DC power and for providing the requested DC power. The supply circuit comprises a detection circuit for sensing a connection to an external device, a source controller circuit for determining a DC output power required by the external device, and a converter circuit for generating the required DC output power. The external device comprises a device controller circuit for communicating the request for DC power. A first conductor provides a path for the device to communicate the required DC power to the power converter and for the power converter to supply the required DC power. A second conductor provides a common reference for conducting return current to the power converter.

41 Claims, 14 Drawing Sheets

U.S. PATENT DOCUMENTS

| | | | |
|---|---|---|---|
| 6,987,449 B2 * | 1/2006 | Novikov | 340/538 |
| 7,027,301 B2 | 4/2006 | Merlet | |
| 7,122,918 B2 * | 10/2006 | Rose | 307/154 |
| 7,124,220 B2 * | 10/2006 | James et al. | 710/104 |
| 7,184,794 B2 * | 2/2007 | Hess et al. | 455/559 |
| 7,242,111 B2 * | 7/2007 | Menas et al. | 307/38 |
| 2004/0085793 A1 * | 5/2004 | Afzal et al. | 363/142 |
| 2004/0130213 A1 | 7/2004 | Goldsholl | |
| 2006/0097578 A1 | 5/2006 | Baldwin et al. | |

FOREIGN PATENT DOCUMENTS

EP          1450461 A2 *   8/2004

* cited by examiner

UNIVERSAL DC POWER

BACKGROUND OF THE INVENTION

1. Field of the Invention

The invention relates generally to power converters and, more particularly, to a DC power source that can provide a range of DC voltages with various current limits to a DC-powered electronic device.

2. Description of the Related Art

Currently, most digital devices (especially, personal digital appliances) use DC power as their primary power source. Because the supply of DC power is not standardized, as is AC power, these devices tend to require DC power to be supplied at various voltage levels. Thus, a digital device must be shipped with its own power source. Typically, the power source is in the form of a "brick" or "wall wart" style supply that converts standard AC power (120V or 220V) to the specific DC power required by the particular digital device.

Providing a power supply with each digital device has many disadvantages. (1) Including a DC power supply with each device increases manufacturing costs and, thus, increases the cost to end-users. (2) Extra solid waste is created when a digital device is discarded. Although it may still be functional, the power supply cannot be used with other digital devices since it is specific to the device. (3) Consumers must keep track of which power supply goes with each digital device they own. (4) Dangerous situations may arise when a confused consumer attempts to use the incorrect power supply with the digital device.

Thus, there is a need for a universal DC power Source along with a digital Device enabled to work with a universal DC power Source to alleviate these problems.

SUMMARY OF THE INVENTION

In one embodiment of the invention, a power converter capable of providing a range of DC power comprises a supply circuit for receiving a request for DC power from at least one external device and for providing the requested DC power to the at least one external device. The power converter further comprises an input circuit for receiving an input voltage and generating a DC input voltage.

In another embodiment of the invention, a DC-powered device requiring DC power comprises a device controller circuit for communicating a request for DC power. The DC-powered device further comprises first and second conductors for connecting the DC-powered device to the power converter. The first conductor provides a path for the DC-powered device to communicate the required DC output power to the power converter and for the power converter to supply the required DC output power to the DC-powered device. The second conductor provides a common reference for conducting return current to the power converter.

In another embodiment of the invention, a method for providing a range of DC power comprises receiving a request for DC power from at least one external device and providing the requested DC power to the at least one external device. The method for providing a range of DC power further comprises generating a DC input voltage from a received input voltage, detecting a connection between the at least one external device and a power converter, determining the DC output power required by the at least one external device, generating the required DC output power from the DC input voltage, and supplying the required DC output power to the at least one external device.

In another embodiment of the invention, a system for providing a range of DC power comprises a means for communicating a request for DC power from at least one external device, and a means for providing the requested DC power to the at least one external device. The system for providing a range of DC power further comprises a means for receiving an input voltage and generating a DC input voltage, a means for detecting a connection to the at least one external device, a means for determining a DC output voltage required by the at least one external device, and a means for generating the required DC output voltage from the generated DC input voltage.

BRIEF DESCRIPTION OF THE DRAWINGS

The above and other features and advantages of embodiments of the invention will become readily apparent by reference to the following detailed description when considered in conjunction with the accompanying drawings.

FIG. 3A describes the operation of the Source Controller from the Idle state through the Detect state to the Comm1 state.

FIG. 3B describes the operation of the Source Controller from the Comm1 state through the PowerOn1 state.

FIG. 3C describes the operation of the Source Controller from the Comm2 state through the PowerOn2 state.

FIG. 3D describes the operation of the Source Controller in the constant current phase of the ChLiIon state.

FIG. 3E describes the operation of the Source Controller in the constant voltage and fast charge phases of the ChLiIon state.

FIG. 3F describes the operation of the Source Controller in the PowerOff state.

DETAILED DESCRIPTION OF THE EMBODIMENTS

The invention will be described below with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
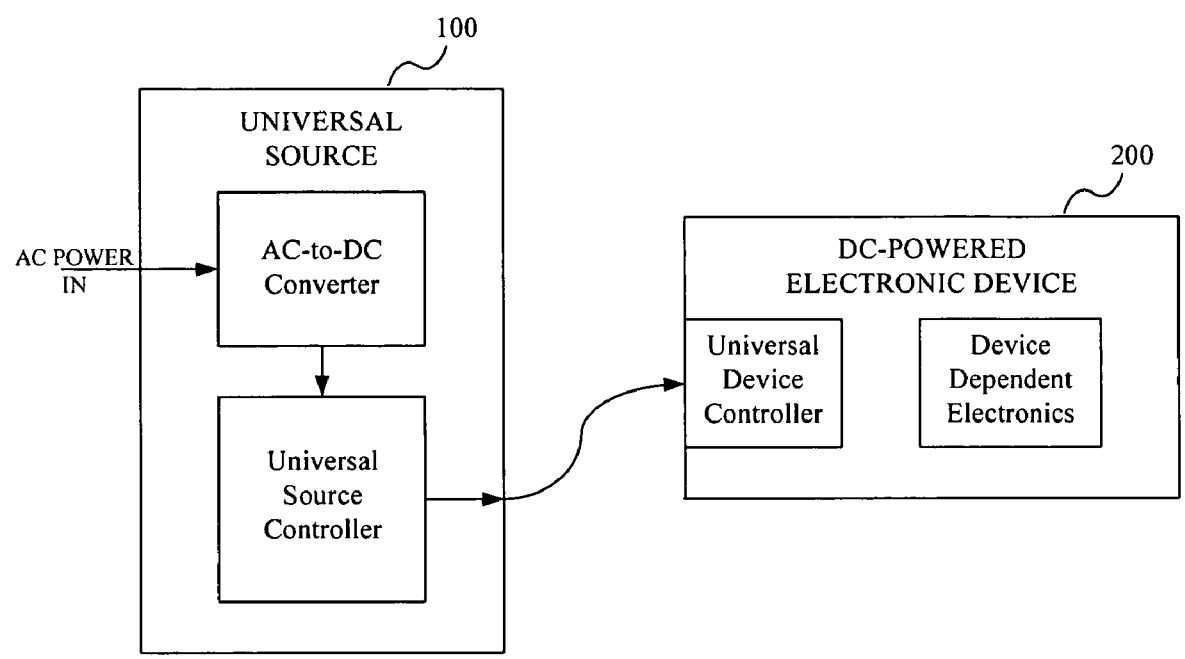
FIG. 1 shows a universal DC power source connected to a DC-powered device.

FIG. 1 is a block diagram of the invention, which comprises a universal DC power source (Source) 100 that can provide a range of DC voltages with various current limits to a DC-powered electronic device (Device) 200. In one embodiment, the Source 100 can supply DC voltages from 1.5VDC to 27VDC with a current of from 100 mA to 25.5 A. The Device 200 has the ability to communicate its voltage and current requirements to the Source 100. When the Device 200 is initially connected to the Source 100, the Source 100 detects the presence of the Device 200. The Device 200 senses the presence of the Source 100 and communicates it power requirements to the Source 100 (e.g., 12 Volts at 600 mA). The Source 100 then provides the required DC power to the Device 200.

Figure 2:
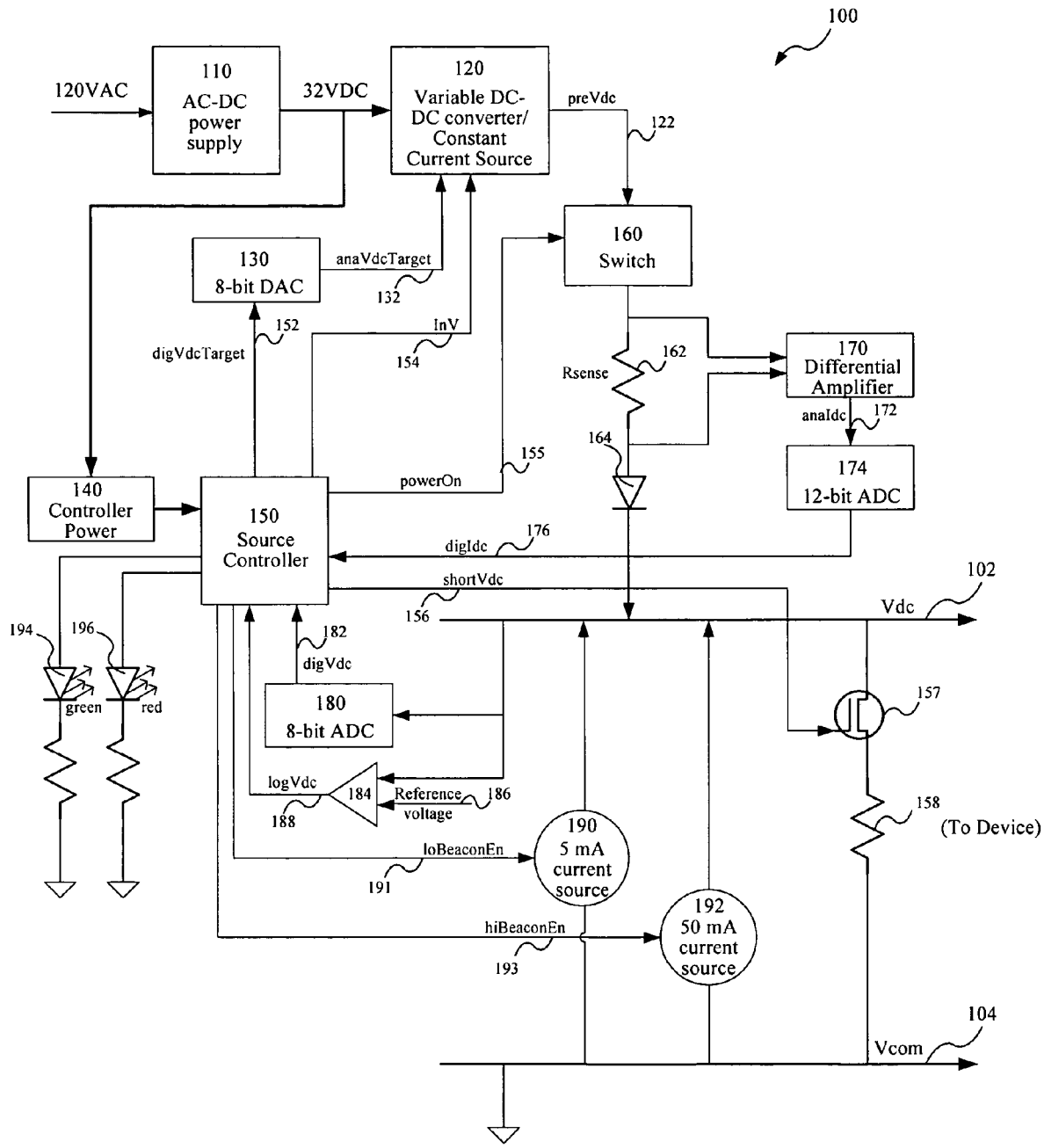
FIG. 2 is a block diagram of a universal DC power source capable of providing a range of DC voltages to a DC-powered device.
Figure 3A:
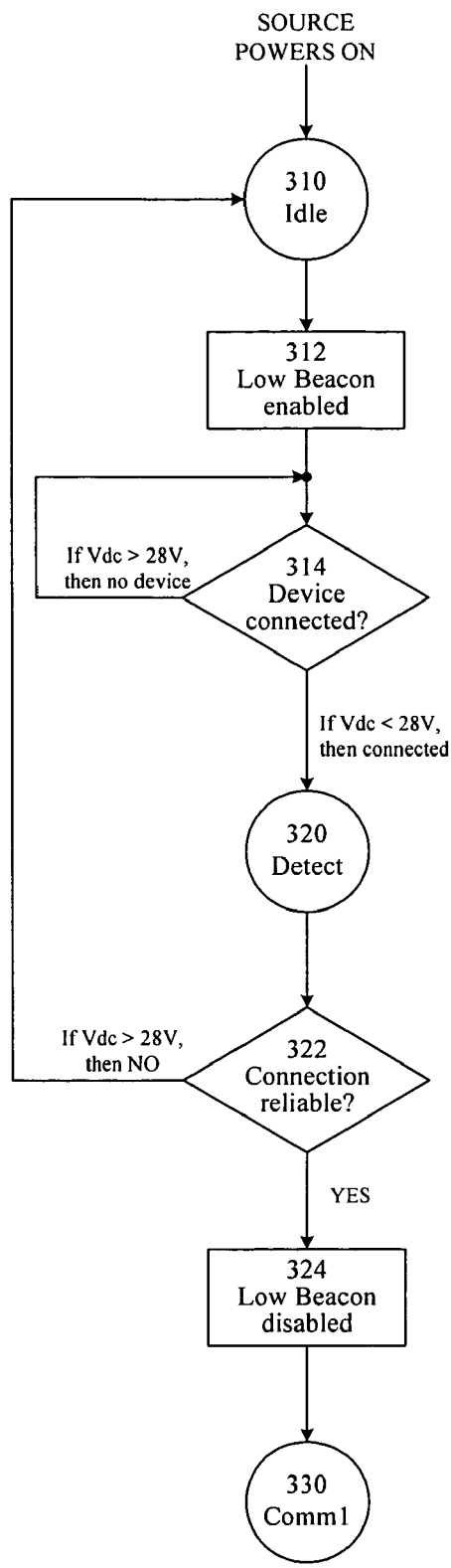
FIGS. 3A-3F illustrates the operation of a Source Controller of the universal DC power source of FIG. 2.
Figure 3B:
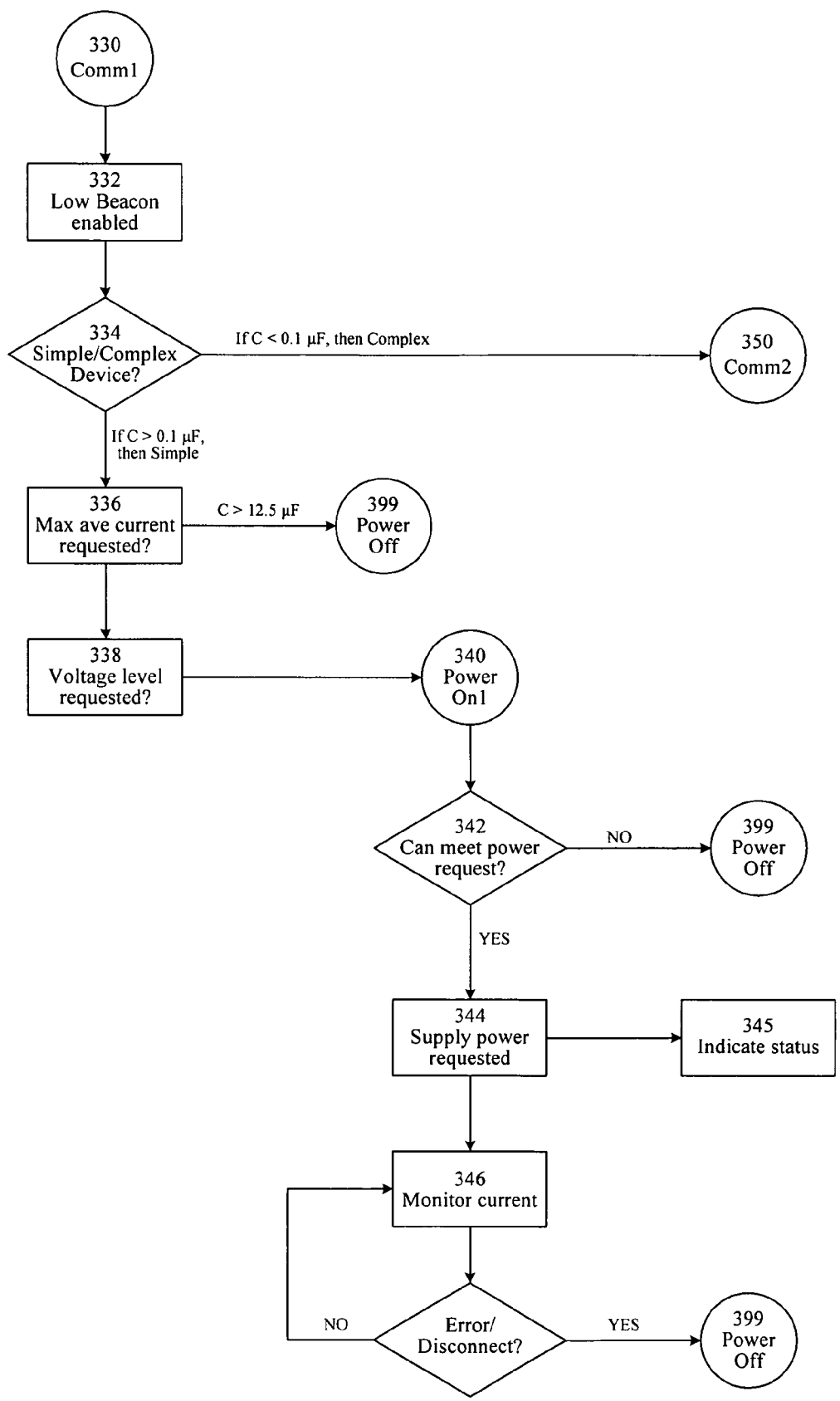
Figure 3C:
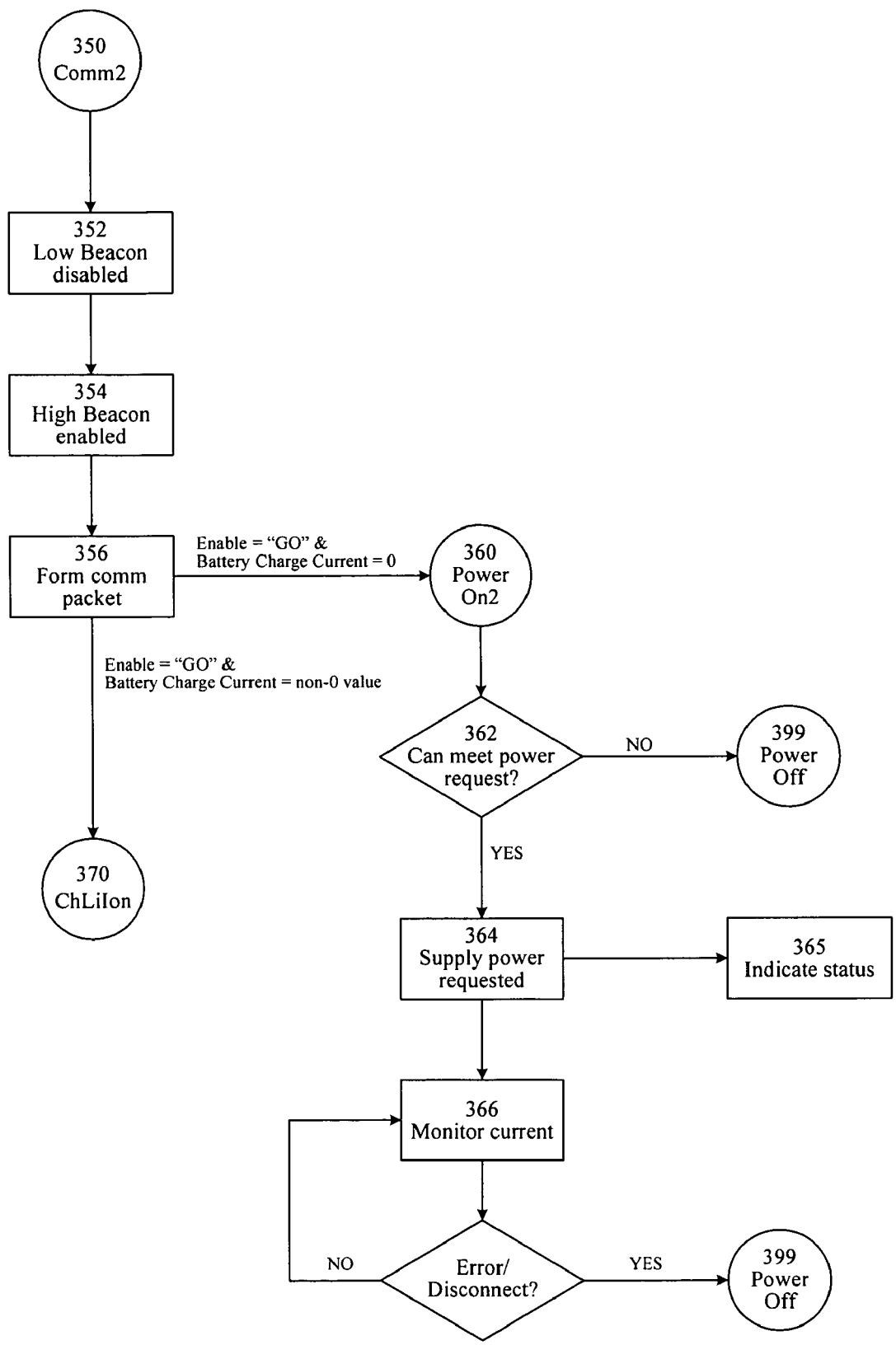
Figure 3D:
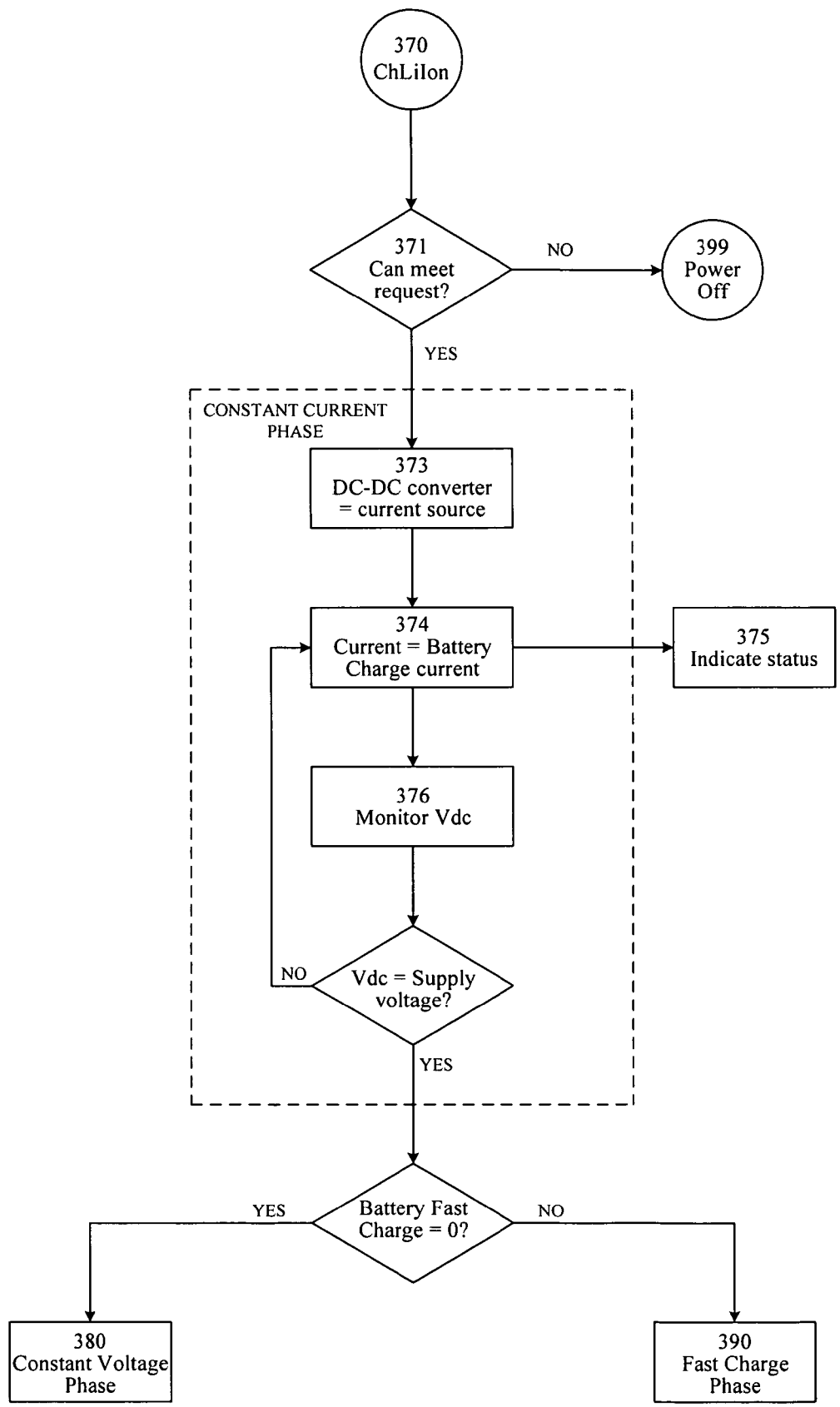
Figure 3E:
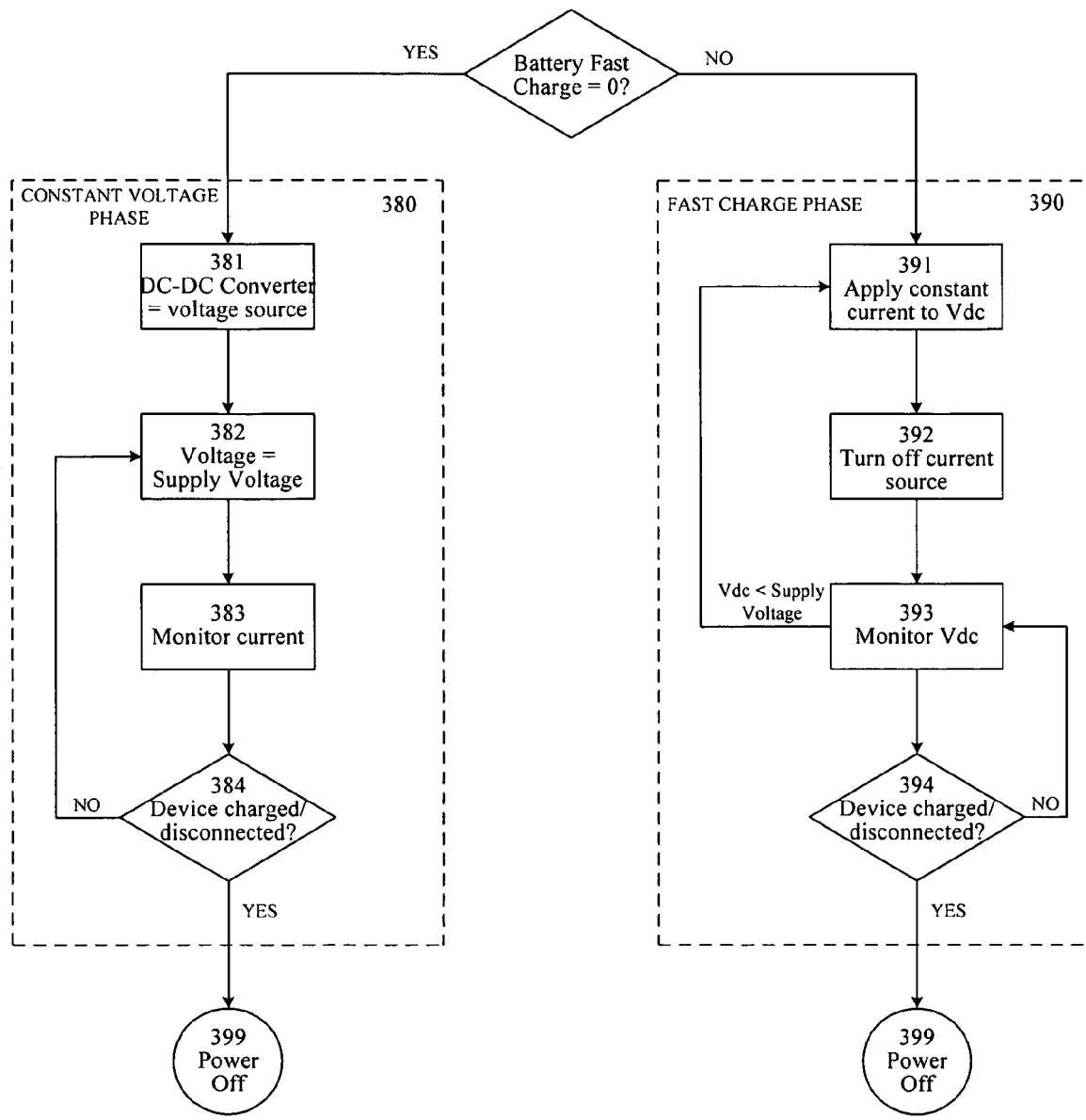
Figure 3F:
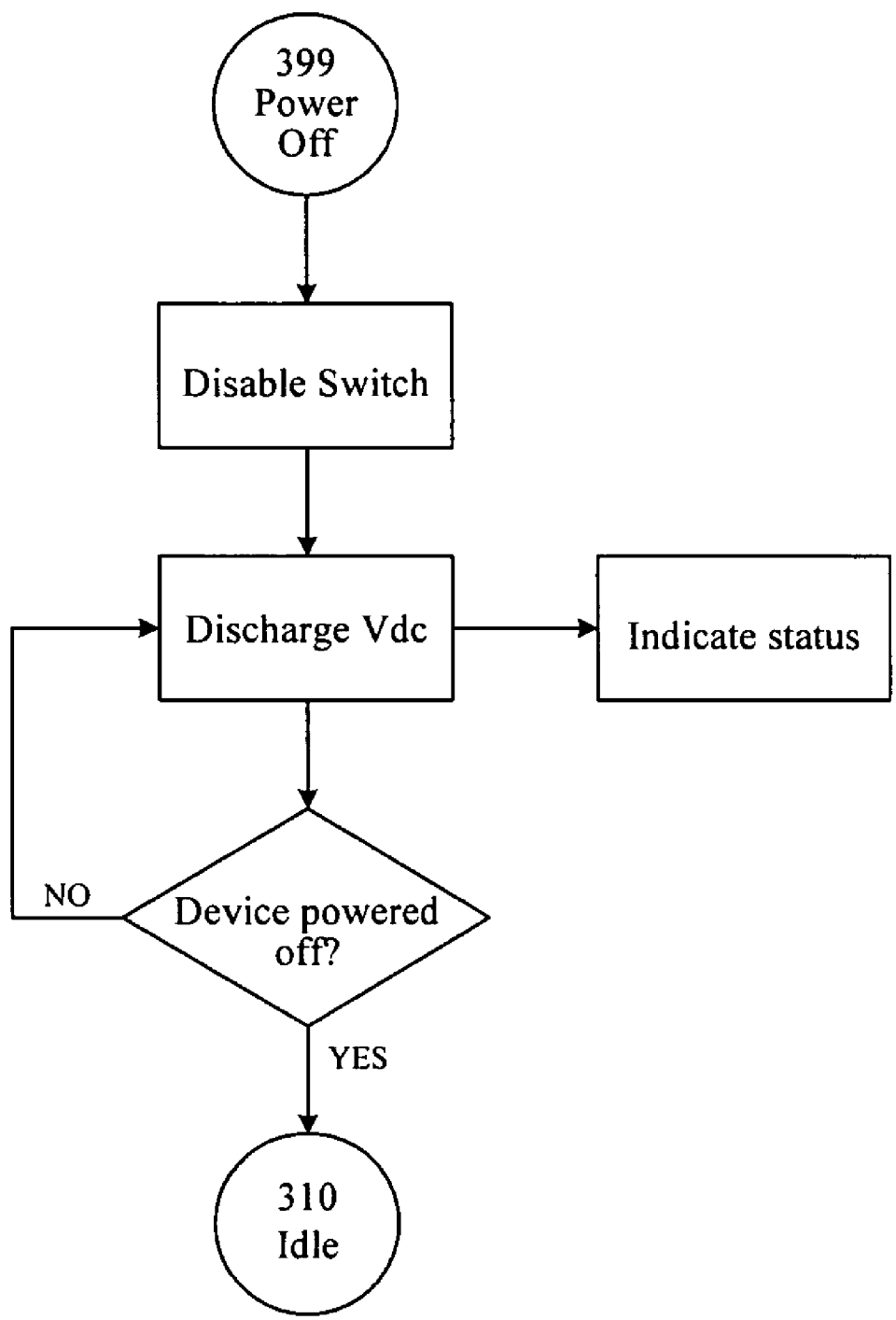

Referring to FIGS. 1 and 2, the Source 100 and the Device 200 are connected to each other through two conductors: Vdc 102 and Vcom 104. Vdc 102 is used by the Device 200 to communicate its power requirements to the Source 100. Vdc 102 is also used by the Source 100 to supply the requested power to the Device 200. Vcom 104 is a common reference or "ground" and is used to conduct return current back to the Source 100.

The Device 200 can use two methods or protocols to communicate its power requirements back to the Source 100, a Simple protocol or a Complex protocol. Although it may be less expensive to implement the Simple protocol, using the Complex protocol increases the accuracy and feature set of the Source 100.

Universal Source 100 FIG. 2 shows one embodiment of the Source 100 which comprises a standard AC-DC power converter 110 to generate 32VDC. In alternate embodiments, as in automotive applications, a step-up DC-DC converter that converts standard 12V power from a car's battery to 32V may replace the AC-DC power converter 110. Similar substitutions may also be made for other applications, such as in commercial aircraft applications.

A digital Source Controller 150 indicates the Device's requested voltage through the 8-bit digVdcTarget signal 152. A variable, step-down DC-DC converter 120 uses the 32VDC to generate the voltage level requested by the Device 200. The DC-DC converter 120 may use standard methods such as, for example, linear regulation, switching regulation, etc. The DC-DC converter 120 uses analog signal anaVdcTarget 132, generated by a digital-to-analog converter 130, as a reference in the generation of the requested voltage level. In one embodiment, the DC-DC converter 120 must be capable of supplying at least 500 mA of current, should be able to supply 10 A, and can supply requests of up to 25.5 A. In one embodiment, the DC-DC converter 120 is also configurable as a constant current source with the current set by the anaVdcTarget signal 132. The InV digital signal 154 indicates to the DC-DC converter 120 whether it is configured as a current source or a voltage source. When charging Lithium-Ion batteries, the DC-DC converter 120 is used in the current source mode.

The DC-DC converter 120 generates the preVdc supply 122, which can be connected to Vdc 102 through a digitally controlled Switch 160, such as a relay or a P-Channel MOSFET. The Source Controller 150 generates powerOn 155 to signal the Switch 160 when to allow power from the preVdc supply 122 to pass through to Vdc 102.

The power supplied to Vdc 102 by the DC-DC converter 120 also passes through Rsense 162. The resistance of Rsense 162, chosen to be small, is used to determine the amount of current that the DC-DC converter 120 is supplying to the Device 200. A differential amplifier 170 detects the small voltage generated by Rsense 162 and converts the differential voltage into a common-mode anaIdc signal 172 referenced to Vcom 104 representing the current flowing from the DC-DC converter 120 into Vdc 102. An analog-to-digital converter 174 converts anaIdc 172 into a 12-bit digIdc signal 176, which is fed into the digital Source Controller 150.

The diode 164 between Rsense 162 and Vdc 102 prevents current from flowing backwards from Vdc 102 into preVdc 122 during communication. In other words, during communication, the total capacitance of Vdc 102 on the Source side must look small. However, the DC-DC converter 120 must have large capacitors associated with it for stability. Thus, during communication, the combination of the Switch 160 and the diode 164 isolates the large capacitance of the DC-DC converter 120 from Vdc 102.

An 8-bit analog-to-digital converter 180 samples the voltage level of Vdc 102 and converts it to an 8-bit digital digVdc signal 182. The digital Source Controller 150 uses digVdc 182 during communication with the Device 200 and also for monitoring the voltage level produced by the DC-DC converter 120. A comparator 184 compares the voltage level of Vdc 102 against a known reference 186 (in one embodiment, the reference is 1.0V) to generate the logvdc signal 188. The logVdc signal 188 is also used during communication with the Device 200.

The Source 100 further comprises a 5 mA current source 190, referred to as the Low Beacon, and a 50 mA current source 192, referred to as the High Beacon. The Low Beacon 190 and High Beacon 192 current sources, controlled (i.e., turned off or on) by the digital Source Controller 150, sense the presence of a Device 200 and power the Device Controller (500 in FIGS. 5A and 5B or 600 in FIGS. 6A and 6B) during communication. In the embodiment shown in FIG. 2, the Low Beacon 190 and High Beacon 192 current sources are powered by the 32VDC supply 140 and, therefore, can only drive their respective currents onto Vdc 102 if Vdc 102 is less than 29 volts. If Vdc 102 is higher than 29 volts, the Low Beacon 190 and High Beacon 192 current sources will begin to supply less current.

The shortvdc signal 156 comes from the digital Source Controller 150 and drives the gate of an N-Channel MOSFET device 157. The circuit comprising the MOSFET 157 and resistor 158 allows the Source Controller 150 to "zero" out Vdc 102 by sinking current from Vdc 102 to Vcom 104. However, because of the resistor 158 (in one embodiment, about 40 ohms) on the source of the MOSFET 157, the actual amount of current this circuit can sink is limited. It is useful to "zero" out Vdc 102 while only the 5 mA Low Beacon 190 or 50 mA High Beacon 192 current sources are in operation.

The Source 100 may further comprise LEDs 194, 196 to indicate the status of the Source 100 to the user. In one embodiment, a green LED 194 may be turned on by the Source Controller 150 to indicate the Source 100 is successfully supplying power to the Device 200. In one embodiment, a red LED 196 may be turned on by the Source Controller 150 to indicate that an error has occurred and that the Device 200 is not being powered by the Source 100.

Source Controller 150

The block diagrams in FIGS. 3A-3F show the states the digital Source Controller 150 (FIG. 2) progresses through during the operation of the Universal DC Source 100. The Idle state 310 is the initial state of the Source Controller 150. When the Source Controller 150 senses that a Device has connected to the Source at block 314, the Source Controller 150 moves to the Detect state 320. At the Com1 state 330, the Source Controller 150 determines whether the Device connected is a Simple or Complex Device. If the Device is a Simple Device, the Source Controller 150 enters the PowerOn1 state 340 after the Simple Device communicates its power request to the Source. If the Device is a Complex Device, the Source Controller 150 enters the Com2 state 350 to communicate with the Complex Device and enters the PowerOn2 state 360 after the Complex Device communicates its power request to the Source. In the ChLiIon state 370, the Source Controller 150 executes a recharge operation for a Lithium-Ion battery. When the Device is disconnected from the Source, the Source Controller 150 moves to the PowerOff state 399.

Refer now to FIGS. 1, 2, and 3A-3E for a more detailed description of the operation of the Source Controller 150. The Source Controller 150 enters the Idle state 310 when the Source 100 is first powered on. While in Idle state 310, the Source 100 disconnects the DC-DC converter 120 from Vdc 102, asserts shortVdc 156, and monitors Vdc 102. When Vdc 102 approaches 0V, the Source 100 de-asserts shortVdc 156 and asserts loBeaconEn 191, thus enabling the 5 mA current source 190 in block 312. The Source Controller 150 then begins to sample Vdc 102, in one embodiment, with an interval of about 100 us, to determine whether a Device 200 has connected to the Source 100. If Vdc 102 is less than 28V, the Source Controller 150 determines that a Device 200 has connected to the Source 100 at block 314, and moves to the Detect state 320. If Vdc 102 is higher than 28V, the Source Controller 150 determines that no Device is connected to the Source 100 and remains in the Idle state 310 with the loBeaconEn 191 enabled, monitoring for a Device to connect. When a Device 200 connects to the Source 100, the voltage on Vdc 102 drops due to the relatively high capacitance of the Device 200 compared to the Source 100. The Source Controller 150 then senses that a Device 200 has connected and moves to the Detect state 320.

In the Detect state 320, the Source Controller 150 de-asserts loBeaconEn 191 and asserts shortVdc 156 until Vdc 102 approaches 0V again. In block 322, the Source Controller 150 then re-asserts loBeaconEn 191, de-asserts shortVdc 156, and monitors Vdc 102 to determine whether the connection between the Source 100 and the Device 200 is reliable. In one embodiment, the Source Controller 150 monitors Vdc 102 for 0.5 seconds, sampling Vdc 102 every 10 ms. If at any time Vdc 102 is sampled above 28V, the connection is deemed unreliable and the Source Controller 150 returns to the Idle state 310. If the connection is found to be reliable, Vdc 102 is again "zeroed" out by de-asserting loBeaconEn 191 and asserting shortVdc 156 in block 324. The Source Controller 150 then proceeds to the Com1 state 330.

The Com1 state 330 has two purposes. First, at the Com1 state 330, the Source 100 measures the capacitive load of the Device 200 and determines if it is a Simple or Complex Device. Second, if the Device 200 is a Simple Device, the Source 100 measures the voltage requested by the Device 200 at the Com1 state.

In the Com1 state 330, the Source Controller 150 de-asserts shortVdc 156 and then asserts loBeaconEn 191, thus enabling the 5 mA current source 190 in block 332. Since the Device 200 should be presenting a predominantly capacitive load and the Source 100 is supplying a constant current into the Device 200, Vdc 102 begins to ramp in a linear fashion. The Source 100 monitors Vdc 102 and measures the amount of time Vdc 102 requires to attain 1.5V (Tdc). The capacitance of the Device 200 can therefore be calculated by the equation:

$$C = \frac{I_{dc}T_{dc}}{V_{dc}} \approx .0033\,T_{dc}$$

Thus, in block 334, if the capacitance of the Device 200 is measured to be below 0.1 µF, the Device 200 is deemed to be a Complex Device and the Source Controller 150 proceeds to the Com2 state 350. If the capacitance of the Device 200 is greater than or equal to 0.1 µF, the Device is deemed to be a Simple Device and the Source Controller 150 continues in the Com1 state 330.

If the Device 200 is a Simple Device, the capacitance measurement is also used, in block 336, to determine the maximum amount of average current the Device 200 is requesting. In one embodiment, the parameter values are as shown in Table 1. If the capacitance value is measured at more than 12.5 µF, an error has occurred and the Source Controller 150 goes into the PowerOff state 399.

TABLE 1

| Measured Capacitance (Cdc) | Maximum Average Current (Idc_max) |
| --- | --- |
| 0.1 µF ≦ Cdc < 0.5 µF | 500 mA |
| 0.5 µF ≦ Cdc < 2.5 µF | 2 A |
| 2.5 µF ≦ Cdc < 12.5 µF | 10 A |
| 12.5 µF ≦ Cdc | Reserved (Error) |

While in the Com1 state 330, the Source Controller 150, in block 338, determines the voltage level requested by a Simple Device. The Source Controller 150 repeatedly samples Vdc 102. When the Source Controller senses that Vdc 102 has reached a steady value and is no longer ramping, the Source Controller 150 determines that the steady value of Vdc 102 is the voltage level the Device is requesting. The Source Controller 150 then moves to the PowerOn1 state 340.

In the PowerOn1 state 340, the Source Controller 150, in block 342, evaluates its ability to meet the Simple Device's request. Primarily, this involves comparing the requested average current requirements with the Source's ability to provide this current. If the Source 100 is unable to supply the requested current, the Source Controller 150 moves to the PowerOff state 399.

If the Source 100 can supply the requested power, the Source Controller 150 drives digVdcTarget 152 to the DC-DC converter 120 as a reference for the requested voltage level. The Source Controller 150 then turns the Switch 160 on and disables the 5 mA Low Beacon current source 190, thus supplying power to the Simple Device at its requested levels in block 344. The Source Controller 150 then, in block 345, may turn on the green LED 194 to provide status to a user.

In the PowerOn1 state 330, the Source Controller 150, in block 346, monitors the current sinked by the Simple Device. In one embodiment, if the average current over a 10-second window exceeds the current communicated by the Simple Device during the Com1 state 330, the Source Controller 150 determines that an error has occurred and the Source Controller 150 moves to the PowerOff state 399. If the Source Controller 150 monitors the Simple Device's current at greater than two (2) times the value communicated during the Com1 state 330, the Source Controller 150 determines that a peak current error has occurred and the Source Controller 150 moves to the PowerOff state 399. Finally, if the average monitored current over a 10-second window drops below 10 mA (referred to as the Hold current), the Source Controller 150 determines that the Simple Device is disconnected and the Source Controller 150 moves to the PowerOff state 399.

If, in the Com1 state 330, the Source Controller 150 determines that the Device 200 is a Complex Device, the Source Controller 150 enters the Com2 state 350. In one embodiment, a Complex Device first signals its presence to the Source 100 by pulling Vdc 102 to a voltage level below 1V for a period of at least 50 μs but no more than 500 μs. In the Com2 state 350, the Source Controller 150, in block 352, disables the 5 mA Low Beacon 190 current source and, in block 354, enables the 50 mA High Beacon 192 current source by asserting hiBeaconEn 193. The higher level of beacon current is supplied to power the Complex Device's more complex electronics.

Next, in block 356, the Complex Device communicates its requirements to the Source 100. The Device 200 repeatedly applies and removes a low resistance to Vdc 102. In one embodiment, the resistance must be low enough such that the voltage level on Vdc 102 drops to less than 1.0V with the 50 mA current source 192 applied. When the resistance is applied and Vdc 102 drops below 1.0V, the Source 100 sees this as the communication of a logical "1". When the Complex Device is not applying this low resistance, the Source sees this as the communication of a logical "0".

Figure 4:
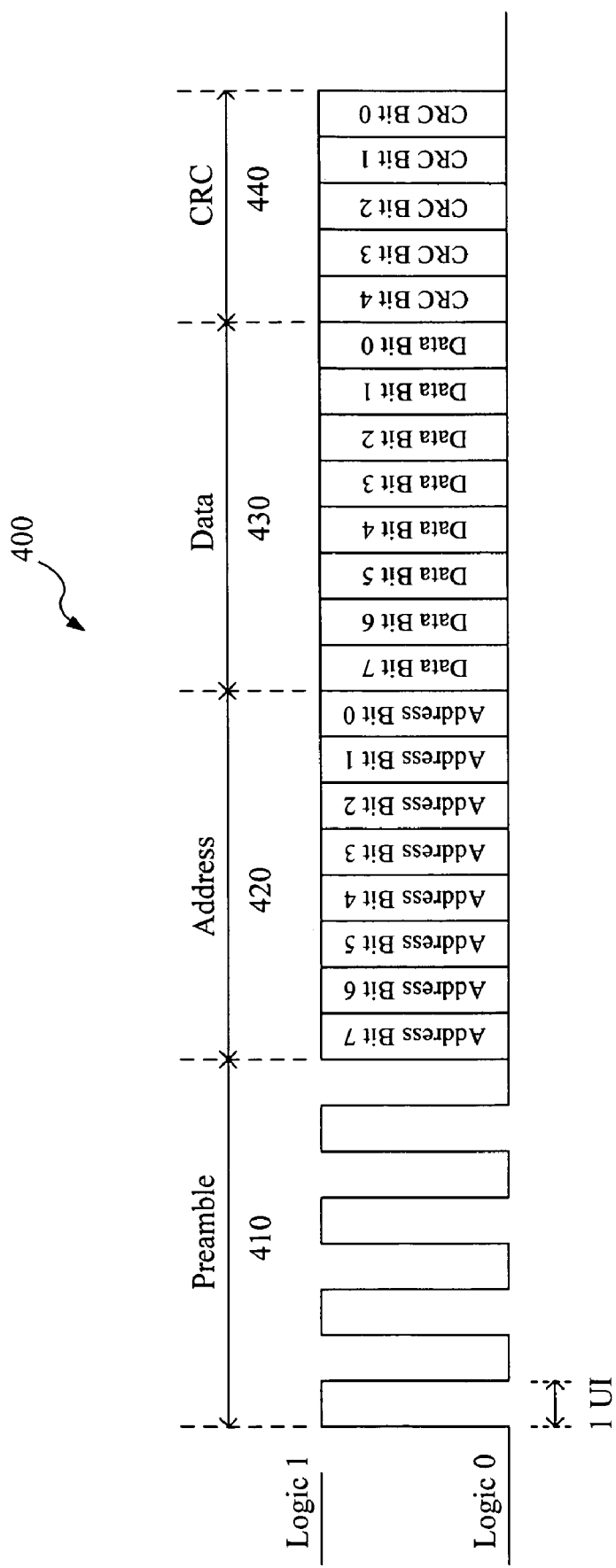
FIG. 4 illustrates one embodiment of a communications packet formed by a Complex Device.

A communications packet 400, shown in FIG. 4, is formed by the Complex Device repeatedly signaling a series of logical 1s and 0s to the Source 100. In one embodiment, the communications packet 400 formed by the Device comprises a preamble 410 of 0xAA. The preamble 410 sends a representative signal of the Device's clock to the Source 100, which synchronizes the Source 100 to the Device. The preamble 410 is used by the Source 100 to measure the unit interval time (UI) of each bit. The time of the UI is nominally 4 μs.

After the preamble 410 is sent, the Complex Device sends an 8-bit address 420, an 8-bit data word 430, and a 5-bit Cyclic Redundancy Check (CRC) 440. The address 420 designates to the Source 100 which power supply parameter the respective data word sets 430. Table 2 shows all legal parameters and the addresses that access them.

TABLE 2

| Address | Parameter | Description |
| --- | --- | --- |
| 0x00 | Supply Voltage | This parameter indicates to the Source what DC voltage the Device is requesting. This value is in 0.1 V increments (e.g., a value of 50 (0x32) indicates 5.0 V). This parameter defaults to 0. |
| 0x01 | Average Current | This parameter indicates to the Source the maximum average current the Device will draw. The average is calculated over 10 seconds. If the Device ever exceeds this value, the Source should shut power off to the Device. This value is in 100 mA increments (e.g. a value of 25 (0x19) indicates 2.5 A). This parameter defaults to 5. |
| 0x02 | Peak Current | This parameter indicates to the Source the maximum peak current the Device will draw. If the source ever samples the Device's current at above this value, the Source should shut power off to the Device. This value is in 100 mA increments (e.g. a value of 100 (0x64) indicates 10.0 A). This parameter defaults to 10. |
| 0x03 | Slew Rate | This parameter indicates to the Source how fast power should be ramped. This value is in 0.1 V/ms (e.g. a value of 45 (0x2D) indicates that the supply voltage will be ramped at the rate of 4.5 V/ms). This parameter defaults to 10. |
| 0x04–0x0f | Reserved | These addresses are reserved for future parameters. Writing to them is an error. |
| 0x10 | Battery Charge Current | A non-zero value in this parameter indicates to the Source that it is charging a Lithium-Ion Battery. The parameter controls the amount of regulated constant current to be supplied in 50 mA increments during the constant current phase of battery charging. This parameter defaults to 0. |
| 0x11 | Battery Fast Charge Time | A non-zero value in this parameter indicates to the Source that it should use the fast charge algorithm instead of the constant voltage phase after the constant current phase has ended. This parameter controls the amount of time the constant current source will be enabled (in 50 ms increments). This parameter defaults to 0. |
| 0x12–0xfe | Reserved | These addresses are reserved for future parameters. Writing to them is an error. |
| 0xff | Enable | When this parameter is written with the value of 0x90 ("GO" command), the Source applies power to the Device using the previously communicated parameters (or their defaults). Any other value than 0x90 written to this parameter is considered an error. This parameter must be that last one written by the Device. |

As the Source 100 receives each data bit of the packet 400 (excluding the preamble 410, but including the CRC 440), the Source 100 applies this bit to a Linear Feedback Shift Register (LSFR) with the polynomial $X^5+X^4+X^2+1$. The polynomial identifies all odd number of bit errors (parity) along with over 99% of two bit errors.

If after applying all bits of the packet 400 to the LSFR, the remainder in the LSFR is non-zero, the Source Controller 150 determines that a bit error must have occurred. In this case, the Source Controller 150 exits the Com2 state 350 and proceeds to the PowerOff state 399.

After the Complex Device communicates a "GO" command (0x90) to the Enable parameter, the Source Controller 150 proceeds to the PowerOn2 state 360, unless a battery charge operation is requested (indicated by a non-zero value in the Battery Charge Current parameter), the Source Controller 150 proceeds to the ChLiIon state 370. Any other value assigned to the Enable parameter is an error, which causes the Source Controller 150 to move to the PowerOff state 399.

In the PowerOn2 state 360, the Source Controller 150, in block 362, evaluates its ability to meet the Complex Device's request. Primarily, this involves comparing the requested average and peak current requirements with the Source's ability to provide this current. If the Source 100 is unable to supply the requested current, the Source Controller 150 moves to the PowerOff state 399.

If the Source 100 can supply the requested power, the Source Controller 150 drives digVdcTarget 152 to the DC-DC converter 120 with a reference value of 0. The Source Controller 150 then turns the Switch 160 on and disables the 50 mA High Beacon current source 192. The Source Controller 150 begins to increase the reference value on digVdcTarget 152 at the rate specified by the Slew Rate parameter until Vdc 102 is being driven at its requested voltage level in block 364. The Source Controller 150 then, in block 365, may turn on the green LED 194 to indicate status to a user.

In the PowerOn2 state 360, the Source Controller 150, in block 366, monitors the current sinked by the Complex Device. If the Source Controller 150 measures average current over a 10-second window that exceeds the value of the Average Current parameter, the Source Controller 150 moves to the PowerOff state 399. Likewise, if the Source Controller 150 measures an instantaneous current that exceeds the Peak Current parameter, the Source Controller 150 moves to the PowerOff state 399. If the average monitored current (over a 10-second window) drops below 10 mA (referred to as the Hold current), the Source Controller 150 determines that the Complex Device is inactive or disconnected and the Source Controller 150 moves to the PowerOff state 399.

If a Device requests a battery charge operation (indicated by a non-zero value in the Battery Charge Current parameter), the Source Controller 150 moves to the ChLiIon state 370 and executes a recharge operation for a Lithium-Ion battery. The Source Controller 150 first evaluates its ability to meet the Device's request in block 371. Primarily, this involves comparing the requested charging current with the Source's ability to provide this current. If the Source 100 is unable to supply the requested charge current, the Source Controller 150 moves to the PowerOff state 399.

The recharge operation begins with a constant current phase where the Source Controller 150, in block 373, configures the DC-DC converter 120 into a current source by asserting the InV signal 154. The Source Controller 150 then drives digVdcTarget 152 with a reference value corresponding to the amount of current the DC-DC converter 150 should drive. This value is determined by the value programmed into the Battery Current parameter. In block 374, the Source Controller 150 turns the Switch 160 on allowing the charging current to flow out of Vdc 102 and disables the 50 mA High Beacon current source 192, thus charging the Device's battery. The Source Controller 150 then, in block 375, may turn on the green LED 194 to indicate status to a user.

In block 376, the Source Controller 150 monitors the voltage level of Vdc 102. When Vdc 102 reaches the value programmed into the Supply Voltage parameter (address 0x00), the Source Controller 150 ends the constant current phase of the recharge operation and enters either the constant voltage phase 380 or the fast charge phase 390. The Source Controller 150 enters the constant voltage phase 380 if the Battery Fast Charge Time parameter is set to 0. The Source Controller 150 enters the fast charge phase 390 if the Battery Fast Charge Time parameter is set to a non-zero value.

During the constant voltage phase 380, the Source Controller 150, in block 381 reconfigures the DC-DC converter 120 to a constant voltage source by de-asserting the InV signal 154 and driving the digVdcTarget 152 with the value of the Supply Voltage parameter. This causes the DC-DC converter 120 to drive the voltage programmed into the Supply Voltage parameter in block 382. The Source Controller 150 then monitors the current in block 383. This continues until the battery is fully charged at which time the Device is disconnected in block 384. The Controller detects this and moves to the PowerOff state 399.

During the fast charge phase 390, in block 391, the constant current programmed into the Battery Current parameter is applied to Vdc 102 for a period of time determined by the Battery Fast Charge Time parameter. After this time, in block 392, the Source Controller 150 turns off the current source by turning off the Switch 160, and the Source Controller 150 monitors the voltage level of Vdc 102 in block 393. When the voltage level on Vdc 102 drops below the voltage programmed into the Supply Voltage parameter, the Source Controller 150 again applies the current specified by the Battery Current parameter for a period of time specified by the Battery Fast Charge Time parameter. The Source Controller 150 repeats this until a disconnect is detected. In this case, the disconnect is detected when no current flows during the Battery Fast Charge Time period. When the Device is disconnected in block 394, the Source Controller 150 moves to the PowerOff state 399.

In the PowerOff state 399, the Source Controller 150 disables the Switch 160 and sets the reference digVdcTarget 152 back to 0. The Source Controller 150 then discharges Vdc 102 by asserting shortVdc 156 and may turn on the red LED 196 to indicate status to a user. In one embodiment, the Source Controller 150 waits in this state for at least 10 seconds, after which time the Device should be completely powered off. The Source Controller 150 then proceeds to the Idle state 310.

Universal Device

Figure 5A:
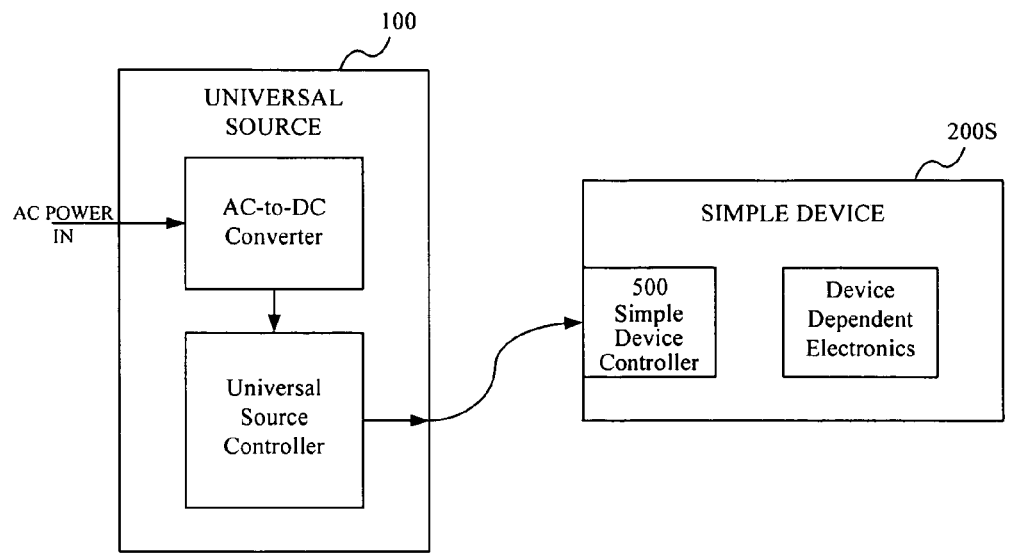
FIGS. 5A and 5B are block diagrams of a Simple Device.
Figure 5B:
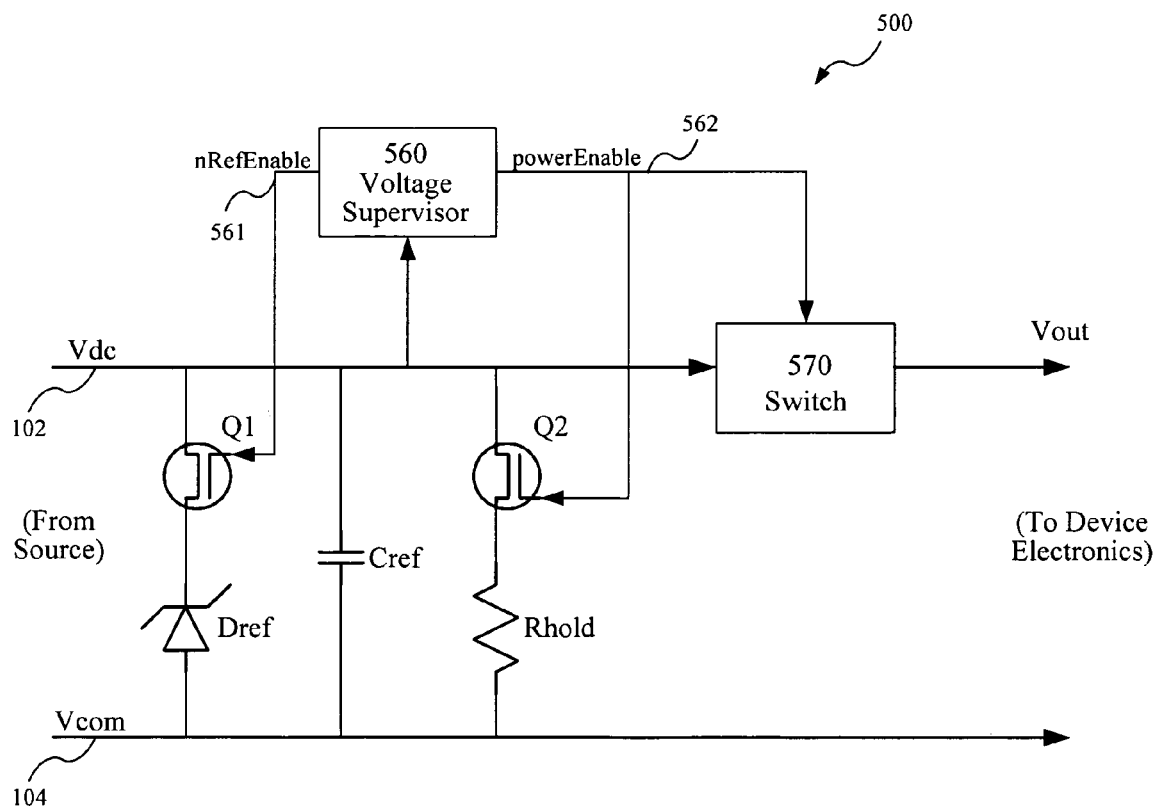
Figure 6A:
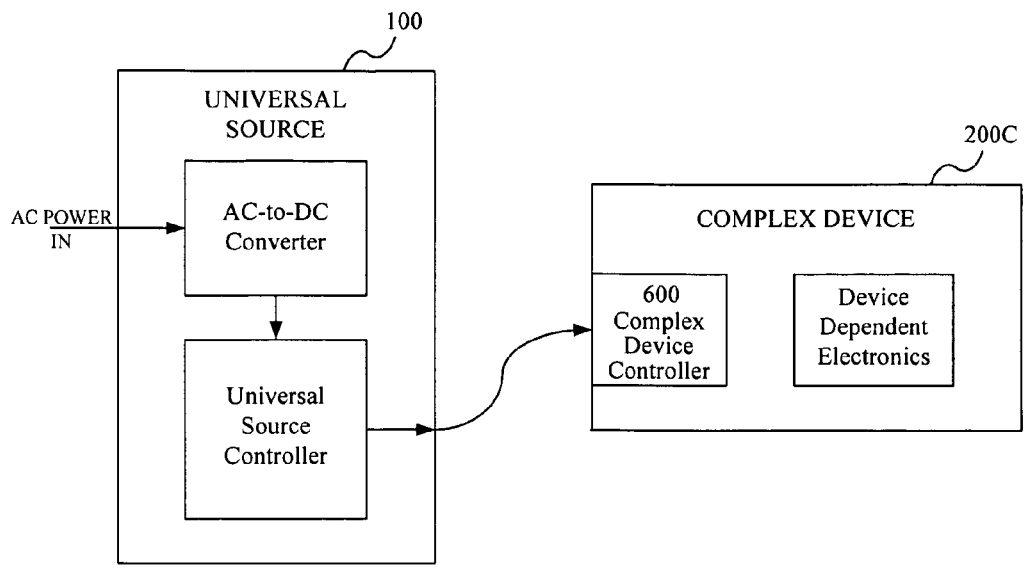
FIGS. 6A and 6B are block diagrams of a Complex Device.
Figure 6B:
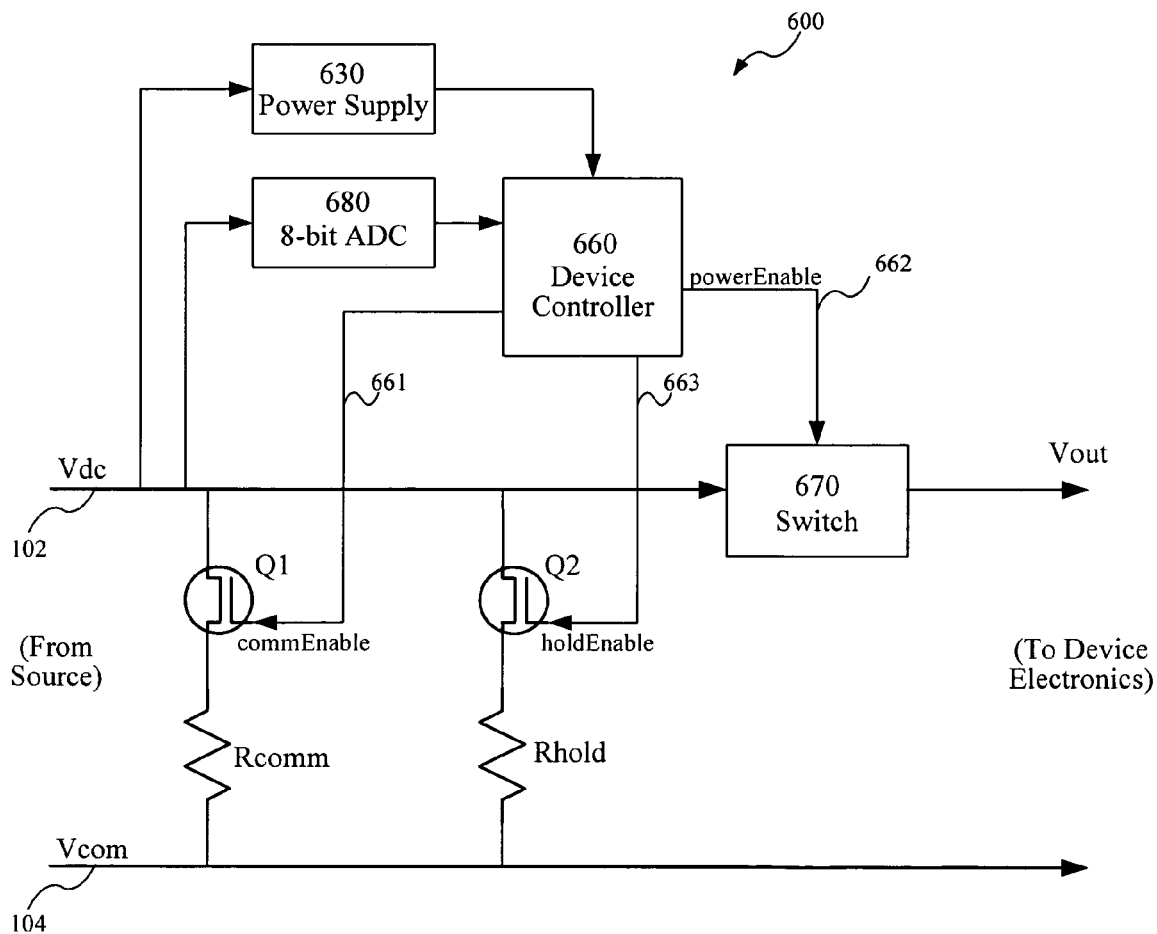

A Device 200 may use either a "Simple" or "Complex" protocol to communicate its power requirements back to the Source 100. FIGS. 5A and 5B illustrate an embodiment of a Simple Device 200S that uses the Simple communication protocol.

Simple Device

Referring now to FIGS. 2, 5A, and 5B, the Zener voltage of Zener diode Dref determines the voltage level requested by the Device 200S in the Simple Device configuration. The capacitance of capacitor Cref determines the maximum average current requested by the Device 200S (see Table 1).

When a Simple Device 200S is first connected to the Source 100 (or when the Source 100 is first powered on, if it is already connected to the Device 200S), the Source 100 provides a regulated Low Beacon current of 5 mA. The fixed Low Beacon current charges capacitor Cref such that the voltage of Vdc 102 ramps linearly. The Source 100 then measures this voltage ramp to determine the value of Cref and, therefore, the maximum average current requested.

The voltage of Vdc 102 continues to ramp under the presence of the Low Beacon current until this voltage reaches the Zener voltage of Dref. At this point, Dref breaks down and begins to sink the Low Beacon current, stopping the voltage ramp of Vdc 102. After this point, Vdc 102 begins to maintain a constant voltage regulated by Dref. When the Source 100 detects that the ramp has stopped, the Source 100 samples the level of Vdc 102. The Source 100 then uses this sampled level of Vdc 102 as the voltage level the Simple Device 200S is requesting.

In an alternate embodiment, a resistor Rref (not shown) may be used in place of Dref and Q1. Resistor Rref is assigned a value according to the equation $$R_{ref} = \frac{V_{ref}}{0.005},$$

where Vref is the requested voltage. Essentially, resistor Rref communicates the requested voltage back to the Source 100 according to the voltage it produced by the Low Beacon current (5 mA) passed through it.

A disadvantage with the alternate embodiment is that resistor Rref would not produce the linear ramp that Zener diode Dref produces, thus making it more difficult for the Source 100 to measure the value of Cref, especially for lower values of Vref. Also, it would always draw 5 mA when the Source 100 was supplying proper power and more if the Source 100 supplied a higher voltage than it should be. This may preclude the ability of the Device 200S to signal a Disconnect. The alternate embodiment using the resistor Rref has the advantage of being simpler and more reliable (from a component failure standpoint).

The Source 100 then applies power at the requested level. The Voltage Supervisor 560 detects that the Source 100 is providing the requested voltage and, after a predetermined amount of time, asserts powerEnable 562 and de-asserts nRefEnable 561. When powerEnable 562 asserts, the electronically controlled Switch 570 turns on and gates the power from Vdc 102 onto the Device's electronics, thus powering the Device 200S. PowerEnable 562 also causes resistor Rhold to be connected to Vdc 102. Resistor Rhold maintains at least a 10 mA current load on Vdc 102. If the Source 100 detects that the Simple Device 200S is drawing less than 10 mA, it deems that the Device 200S has disconnected. The de-assertion of nRefEnable 561 causes Dref to be disconnected from Vdc 102, thus protecting Dref.

If the Voltage Supervisor 560 detects that the Source 100 is supplying a voltage greater or less than it expects, it de-asserts powerEnable 562 and leaves nRefEnable 561 de-asserted. This effectively turns off the Simple Device 200S and causes the Source 100 to go to PowerOff.

Complex Device

FIG. 6 illustrates an embodiment of a Device 200C that implements the Complex communication protocol.

In one embodiment, the Complex Device 200C must present less than a 0.1 μF capacitive load on Vdc 102 when the electronic controlled Switch 670 is off (i.e., the capacitive loading from the Device's electronics are isolated from Vdc 102). Since there is no Cref present in the Complex Device Controller 600 as with the Simple Device Controller 500 (in FIGS. 5A and 5B), all capacitive loading on Vdc 102 is due to the parasitic loads of the components connected to it. In practice, limiting these parasitic loads to below 0.01 μF is easily achieved.

When a Device presents a small capacitive loading (less than a 0.1 μF capacitive load) on Vdc 102, the Source 100 detects it as a Complex Device 200C and supplies the regulated 50 mA High Beacon current. Power from the High Beacon current is used by the Power Supply 630 to generate power for the Complex Device's digital Controller 660.

After the Device Controller 660 powers up, it signals its presence to the Source 100 by asserting commEnable 661, in one embodiment, for a period of time of no less than 50 μs and no more than 500 μs. This causes Q1 to conduct the entire High Beacon current through Rcomm to Vcom 104 and effectively pulls Vdc 102 to under 1V. The value of Rcomm is selected so that it can conduct all 50 mA of the High Beacon without generating a large voltage; in one embodiment, a value of about 10 ohms is reasonable.

While the Device Controller 660 is signaling its presence to the Source 100, it samples Vdc 102 with the 8-bit ADC 680 to make certain that it is able to pull Vdc 102 below 1V. If it is not, it could mean that the Source 100 has somehow mistakenly started supplying power to the Device 200C. In this case, the Device 200C discontinues operation and shuts down. If the Source 100 is mistakenly in a PowerOn state, the Source 100 sees the Device 200C shutting down as a Disconnect and the Source 100 proceeds to the PowerOff and Idle states and eventually starts communications over.

After successfully signaling its presence to the Source 100, the Device 200C begins to communicate its power requirements to the Source 100 using the packet protocol previously discussed for the Com2 state. The logical 1s and 0s are generated by the Device Controller 660 asserting (for a 1) and de-asserting (for a 0) the commEnable signal 661. After communicating the power requirements, the Device Controller 660 sets the Enable parameter to 0x90 ("GO"), which signals the Source 100 to begin supplying power to the Device 200C as specified. Any parameters that have not been explicitly set by the Device Controller 660 are set to their default values.

After communicating a "GO" to the Source 100, the Device Controller 660 asserts the powerEnable signal 662, thus turning on the Switch 670 and allowing the power supplied by the Source 100 to reach the Device's electronics. The Device Controller 660 also asserts the holdEnable signal 663 to connect resistor Rhold to Vdc 102. In one embodiment, resistor Rhold draws at least 10 mA of current in order to maintain a connection with the Source 100.

The Device Controller 660 now begins to sample Vdc 102 with its 8-bit ADC 680. If the Source 100 does not supply the proper voltage to the Device 200C requested during communication, (e.g., Vdc 102 is 20V when 12V was requested), the Device Controller 660 de-asserts the powerEnable signal 662 and the holdEnable signal 663 and shuts down. The Source 100 should see this as a Disconnect and start over.

Power Supply 630

Figure 7:
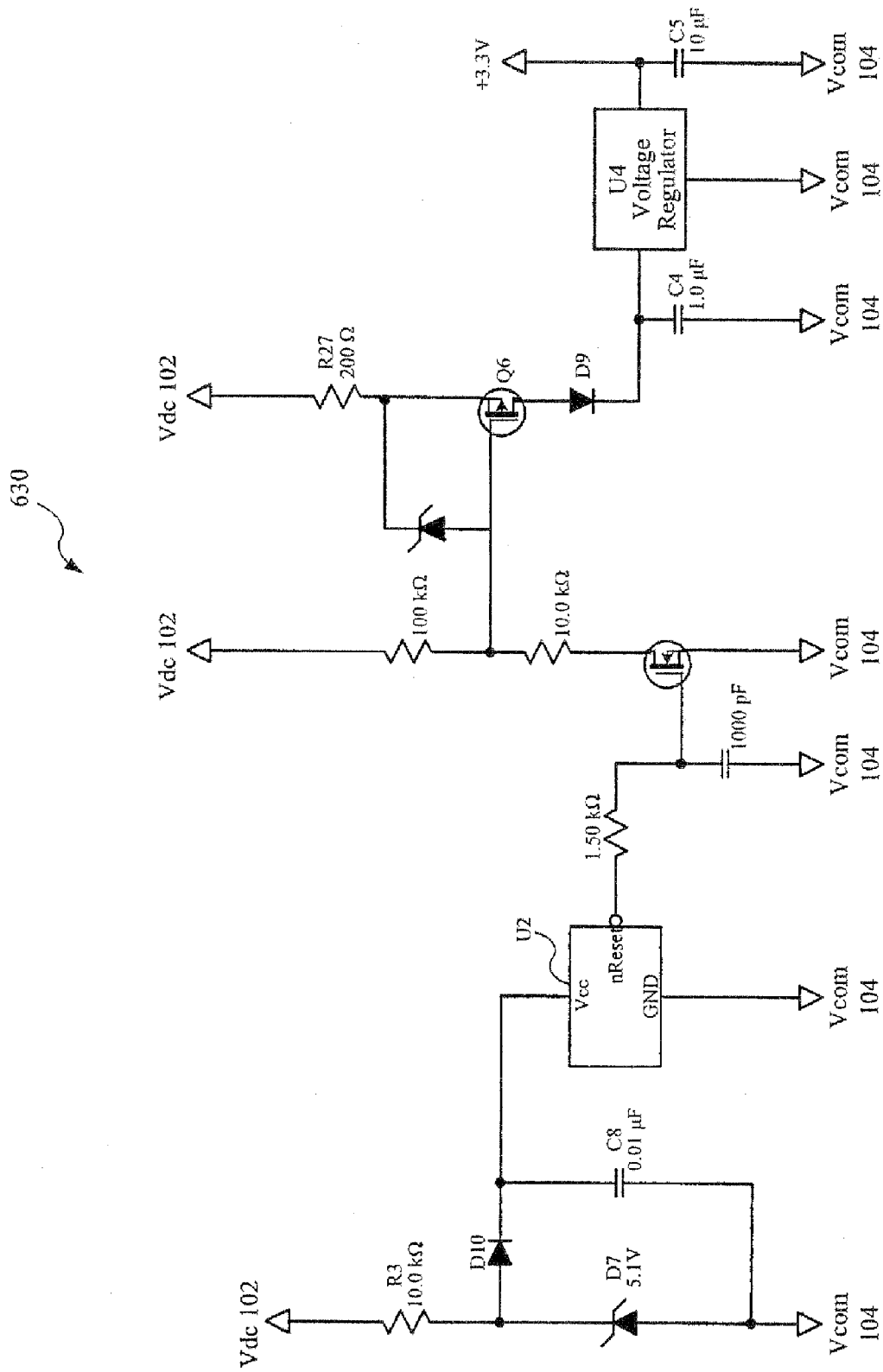
FIG. 7 is a schematic of one embodiment of a power supply of the Complex Device in FIG. 6B.

FIG. 7 shows a schematic diagram of a Power Supply 630 that is able to meet the requirements of a Complex Device 200C, the requirements including: (1) limit capacitive loading of Vdc 102 during Com1 phase; (2) don't turn on until Com2 phase; and (3) continue supplying the Device Controller 660 with power even while the Device Controller 660 is pulling Vdc 102 to 0V by asserting the commEnable signal 661.

In one embodiment, the Power Supply 630 comprises a voltage regulator U4, a linear 3.3V regulator (for a digital Device Controller 660 requiring 3.3V). The regulator U4 converts the voltage accumulated on capacitor C4 into 3.3V as long as the voltage on capacitor C4 is above about 4V. Capacitor C4 is charged by the High Beacon current through resistor R27, transistor Q6, and diode D9. Transistor Q6 acts as a switch that isolates capacitor C4 from Vdc 102 when it is off. Diode D9, insures that current cannot backflow from capacitor C4 to Vdc 102 when Vdc 102 is being pulled low by the Device Controller 660 asserting the commEnable signal 661. Resistor R27 is a feedback resistor that limits the in-rush current into capacitor C4 when Q6 turns on. The output of U4 is stabilized by capacitor C5. Capacitor C5 also stores energy for use when commEnable 661 is asserted and Vdc 102 is pulled to below 1V. Capacitor C5 and diode D9 ensure that the Device Controller 660 does not reset itself whenever it asserts commEnable 661.

The power supply 630 comprises U2, a reset supervisor and used to time the turn on of transistor Q6 and, subsequently, voltage regulator U4. When the Source 100 enables the Low Beacon current during the Com1 phase and then the High Beacon current during the Com2 phase, C8 is slowly charged. In the embodiment shown in FIG. 7, the power supply 630 further comprises resistor R3, which functions to isolate the capacitance of C8 from Vdc 102. Although the capacitance of C8 is less than 0.1 μf, it doesn't hurt to minimize the capacitive loading on Vdc 102 during Com1. Diode D10 ensures that capacitor C8 is not discharged whenever the Device Controller 660 asserts the commEnable signal 661, which may inadvertently cause the reset supervisor U2 to reenter its reset cycle. In one embodiment, D7 is a 5.1V Zener diode, which functions to ensure that the maximum input voltage of the reset supervisor U2 is not exceeded.

Additional Architectures

Figure 8:
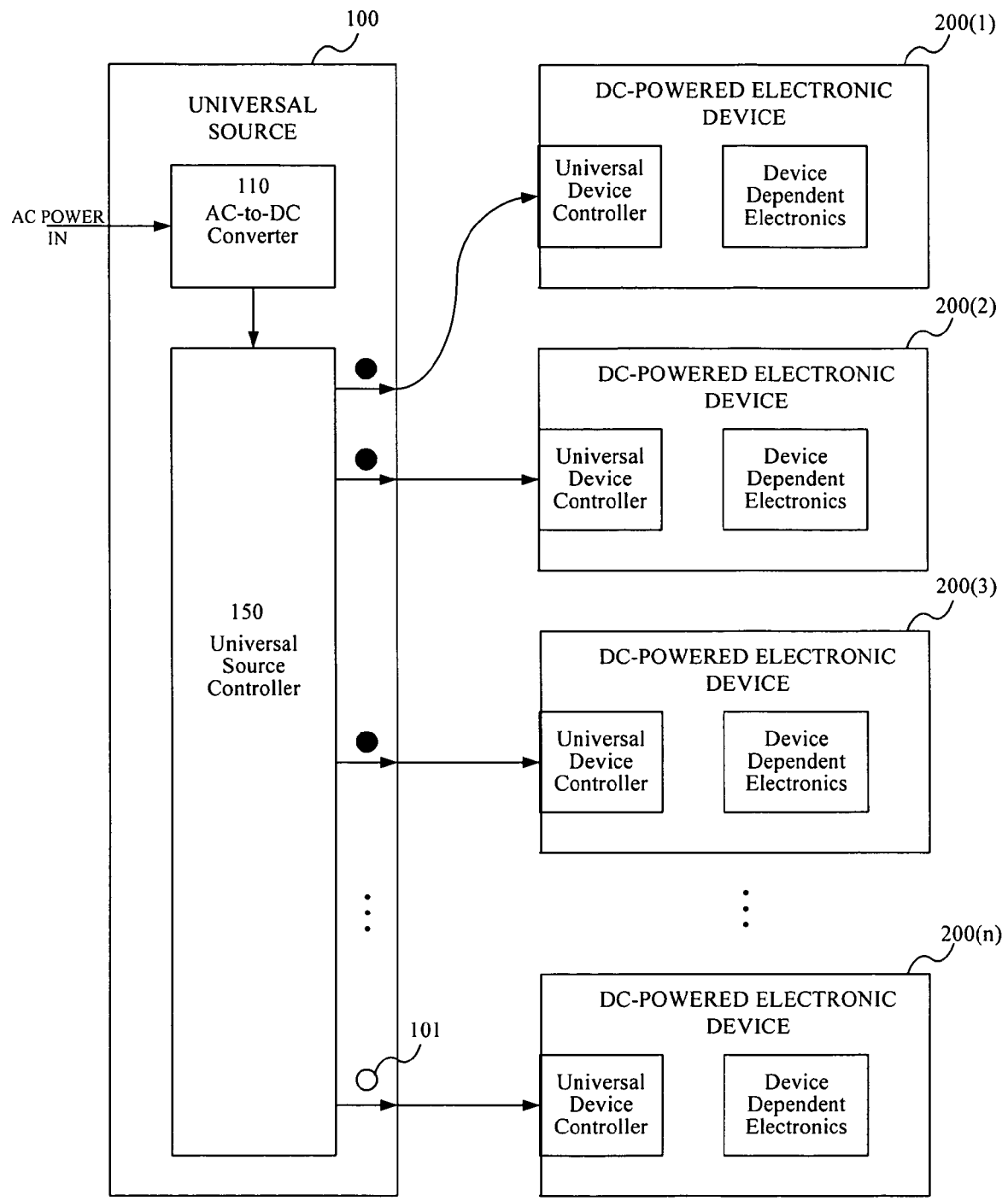
FIG. 8 is a block diagram of a universal DC power source capable of providing DC power to multiple Devices.

FIG. 1 shows a Source 100 supplying only a single Device 200. However, as shown in FIG. 8, nothing in the invention precludes a Universal Source 100 that supplies multiple Devices 200(1)-200(n). In this embodiment, a single AC-DC Power Supply 110 and digital Source Controller 150 are used to control all power ports of the Source 100. However, all other components of FIG. 8 would be replicated for each port. Moreover the digital Source Controller 150 (although common) would need to be expanded to include the ability to control multiple ports.

The Source Controller 150 would also be required to budget the power supplied by the AC-DC Power Supply 110 across the various requests from multiple Devices 200(1)-200 (n). FIG. 8 illustrates that the last Device 200(n) was refused power, as indicated by indicator 101, because its request exceeded the Source's ability to provide it.

Figure 9:
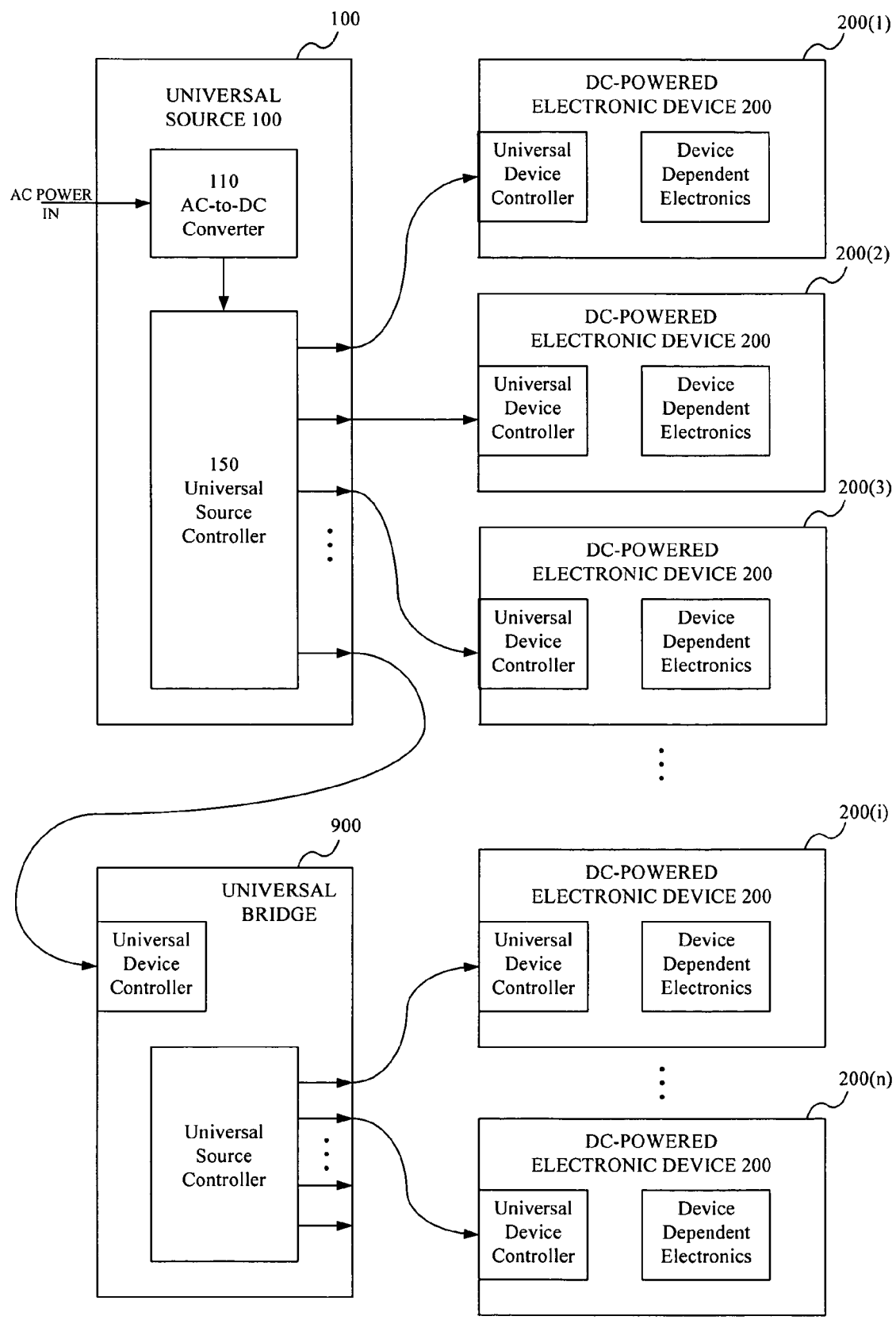
FIG. 9 is a block diagram of a universal DC power source coupled to a universal bridge.

In another embodiment, as illustrated in FIG. 9, a Universal Splitter or Bridge 900 may be connected to and communicate with a Source 100 as any other Device would. In turn, the Bridge 900 then uses the power from the Source 100 to supply multiple Devices 200(i)-200(n). Any Device plugged into the Bridge 900 would see the Bridge 900 as any other Universal Source 100.

In one embodiment, the Bridge 900 may request the maximum voltage possible (for example, 27V). The Bridge 900 would either pump that voltage up to a level greater than or equal to 32V to supply a full range of voltages to its Devices 200(i)-200(n), or it would simply deny power to any Device that requested above what it could provide (about 23-24V). The Bridge 900 would also be required to budget the maximum average and peak currents that it requested from the Source 100 to its Devices 200(i)-200(n).

Having described exemplary embodiments of the invention, it is noted that modifications and variations can be made by persons skilled in the art in light of the above teachings. Therefore, it is to be understood that changes may be made to embodiments of the invention disclosed that are nevertheless still within the scope and the spirit of the invention as defined by the appended claims.

What is claimed is:

1. A power converter capable of providing a range of DC power, comprising:
   a supply circuit for receiving a request for DC power from at least one external device and for providing the requested DC power to the at least one external device, wherein the external device comprises:
   a device controller circuit for communicating the requested DC powers using a communications protocol selected from a plurality of communications protocols including a simple protocol and a complex protocol, wherein the simple protocol is identified when a capacitive load of the external device is greater than a threshold capacitive value and the complex protocol is identified when the capacitive load is less than the threshold capacitive value; and
   first and second conductors for connecting the at least one external device to the power converter, wherein the first conductor provides a path for the at least one external device to communicate the requested DC output power to the power converter and for the power converter to supply the requested DC output voltage to the at least one external device, and wherein the second conductor provides a common reference for conducting return current to the power converter.

2. The power converter of claim 1, further comprising:
   an input circuit for receiving an input voltage and generating a DC input voltage.

3. The power converter of claim 2, wherein the input circuit receives an AC voltage.

4. The power converter of claim 2, wherein the input circuit receives a DC voltage.

5. The power converter of claim 2, wherein the supply circuit comprises:
   a detection circuit for sensing a connection to the at least one external device;
   a source controller circuit for determining the requested DC output power; and
   a converter circuit for generating the requested DC output power from the generated DC input voltage after the DC output power has been determined.

6. The power converter of claim 5, wherein the converter circuit is configurable as a current source.

7. The power converter of claim 2, wherein the supply circuit comprises:
   a plurality of detection circuits for sensing connections to a plurality of external devices;
   a single source controller circuit for determining a plurality of DC output powers required by the plurality of external devices; and
   a plurality of converter circuits for generating the plurality of required DC output powers from the generated DC input voltage, wherein the single source controller monitors the required DC output powers from the plurality of external devices.

8. The power converter of claim 7, wherein the single source controller refuses the request for DC power from the at least one external device when the requested DC output power exceeds an available power supply of the power converter.

9. The power converter of claim 2, wherein the DC input voltage is received from a second power converter, the power converter further comprising:
   a universal device controller circuit for communicating a request for DC input power over a bridge connection to the second power converter, wherein the DC input power is also supplied over the bridge connection.

10. The power converter of claim 1 wherein the power converter is implemented in a semiconductor device.

11. A method of providing DC power to an external device connected to a power source by a first conductor and a second conductor, the method comprising:
    receiving a request for DC output power from the external device over the first conductor;
    transmitting the requested DC output power to the external device over the first conductor, wherein the second conductor provides a common reference for conducting return current to the power source; and
    supplying a constant current to the external device such that a voltage level on the first conductor ramps in a linear fashion.

12. The method of claim 11, further comprising:
    generating a DC input voltage from a received input voltage;
    detecting a connection between the external device and the power source, wherein the power source is a power converter;
    determining the DC output power required by the external device;
    generating the required DC output power from the DC input voltage; and
    supplying the required DC output power to the external device.

13. The method of claim 12, wherein detecting the connection between the external device and the power converter comprises:

sampling a voltage level at a first conductor connecting the external device to the power converter, wherein the connection is detected when the voltage level drops below a threshold voltage value.

14. The method of claim 11, further comprising measuring a capacitive load on the first conductor to identify a communications protocol selected from a plurality of communications protocols including a simple protocol and a complex protocol, prior to transmitting the requested DC output power.

15. The method of claim 14, wherein the simple protocol is identified when the capacitive load is greater than a threshold capacitive value and the complex protocol is identified when the capacitive load is less than the threshold capacitive value.

16. The method of claim 15 wherein the threshold capacitive value is approximately 0.1 microfarads.

17. The method of claim 14 wherein, if the external device is determined to be using the simple protocol, the method further comprises:
determining a maximum average current required by the external device; and
repeatedly sampling a voltage level at the first conductor until a steady value of the sampled voltage level is measured to determine the requested DC output power.

18. A method of providing DC power to an external device connected to a power source by a first conductor and a second conductor, the method comprising:
receiving a request for DC output power from the external device over the first conductor; and
transmitting the requested DC output power to the external device over the first conductor, wherein the second conductor provides a common reference for conducting return current to the power source; and
measuring a capacitive load on the first conductor to identify a communications protocol selected from a plurality of communications protocols including a simple protocol and a complex protocol, prior to transmitting the requested DC output power wherein, if the external device is determined to be using the complex protocol, the method further comprises:
receiving a communications packet formed by the external device prior to transmitting the DC output power, the packet indicating select electrical parameters including the requested DC output power.

19. The method of claim 18, wherein the electrical parameters of the DC output power comprise:
a DC output voltage;
a maximum average current;
a maximum peak current; and
a slew rate of DC output voltage turn-on ramp.

20. The method of claim 18, wherein the communications packet further comprises a parameter for signaling that the external device includes a battery requiring a recharge operation.

21. The method of claim 20, wherein generating and supplying the requested DC output power in the battery recharge operation comprises:
configuring a converter circuit into a current source;
generating a current, the current value defined by the communications packet;
charging the battery with the generated current until the voltage level at the first conductor reaches the DC voltage value defined by the communications packet; and
entering a final charging phase.

22. The method of claim 21, wherein the final charging phase is a constant voltage phase comprising:
configuring the converter circuit as a voltage source;
generating a DC voltage, the voltage value defined by the communications packet; and
charging the battery with the generated DC voltage until the battery is fully charged or until the battery is disconnected.

23. A method comprising:
receiving a request for DC power from at least one external device including a rechargeable battery, the external device connected to a DC power source by a conductor;
identifying a device voltage level and a device current level for the external device;
configuring a converter circuit as a current source;
generating a current corresponding to the device capacity level;
applying the generated current for a predetermined time to the conductor;
disabling the converter circuit configured as a current source; and
charging the battery until a voltage level on the conductor reaches the device voltage level or until the battery is disconnected.

24. A system for providing a range of DC power to an external device connected to a power source by a first conductive means and a second conductive means, comprising:
means for communicating a request for DC power from the external device over the first conductive means, wherein the means for communicating a request for DC power comprises a communications protocol selected from a plurality of communications protocols including a simple protocol and a complex protocol, and wherein the simple protocol is identified when the capacitive load is greater than a threshold capacitive value and the complex protocol is identified when the capacitive load is less than the threshold capacitive value; and
means for providing the requested DC power to the external device over the first conductive means, wherein the second conductive means provides a common reference for conducting return current from the external device to the power source.

25. The system of claim 24, further comprising:
means for receiving an input voltage and generating a DC input voltage;
means for detecting a connection to the at least one external device;
means for determining a DC output voltage required by the at least one external device; and
means for generating the required DC output voltage from the generated DC input voltage.

26. The system of claim 24, wherein the means for communicating a request for DC power for the simple protocol comprises:
means for establishing a DC output voltage required by the at least one external device; and
means for establishing the maximum average current required by the at least one external device.

27. The system of claim 24, wherein the means for communicating a request for DC power for the complex protocol comprises:
means for forming communications packets indicating select electrical parameters of the requested DC power.

28. The system of claim 27, wherein the electrical parameters of the requested DC power comprise:
a DC output voltage;
a maximum average current;
a maximum peak current;
a slew rate of DC output voltage turn-on ramp;
a battery charge current;

and a battery fast charge time.

29. The power converter of claim 1, wherein the device controller circuit comprises:
 a first circuit for establishing the required DC output voltage; and
 a second circuit for establishing a maximum average current of the at least one external device.

30. The power converter of claim 29, wherein the first circuit comprises a zener diode and a first transistor connected in series between the first and second conductors.

31. The power converter of claim 29, wherein the first circuit comprises a resistor connected between the first and second conductors.

32. The power converter of claim 29, wherein the second circuit comprises a capacitor connected between the first and second conductors.

33. The power converter of claim 29, wherein the device controller circuit further comprises a switching circuit for detecting the DC output power supplied by the power converter and providing the supplied DC output power to the at least one external device.

34. The power converter of claim 29, wherein the device controller circuit further comprises:
 a loading circuit coupled to the first and second conductors for providing a disconnect signal to the power converter.

35. The power converter of claim 34, wherein the loading circuit comprises a resistor and a transistor connected in series between the first and second conductors.

36. The power converter of claim 1, wherein the device controller circuit comprises:
 a first circuit for signaling the presence of the DC-powered device to the power converter;
 a communications circuit for forming a communications packet indicating select electrical parameters of the required DC output power;
 a switching circuit for detecting the DC output power supplied by the power converter and providing the supplied DC output power to the at least one external device; and
 a loading circuit coupled to the first and second conductors for providing a disconnect signal to the power converter.

37. The power converter of claim 36, further comprising:
 a power supply circuit having an input coupled to the first conductor and an output coupled to the device controller circuit, wherein the output remains steady for short periods of time when power to the input is removed.

38. The method of claim 23, wherein the device voltage level and the device capacity level are included in a communications packet received from the external device.

39. The method of claim 38, wherein the communications packet further comprises a parameter for signaling that the external device includes the rechargeable battery.

40. The power converter of claim 1, wherein the capacitive load is measured on the first conductor.

41. The power converter of claim 1, wherein the power converter is configured to provide an initial DC power supply to the at least one external device, the initial DC power supply sufficient to allow the at least one external device to communicate with the power converter, and wherein the requested DC power is greater than the initial DC power supply.

* * * * *

UNITED STATES PATENT AND TRADEMARK OFFICE
CERTIFICATE OF CORRECTION

PATENT NO. : 7,466,042 B2 Page 1 of 1
APPLICATION NO. : 11/101036
DATED : December 16, 2008
INVENTOR(S) : Eldredge It is certified that error appears in the above-identified patent and that said Letters Patent is hereby corrected as shown below:

At column 13, line 44, please replace "DC powers" with --DC power--.

Signed and Sealed this

Sixteenth Day of March, 2010

David J. Kappos
*Director of the United States Patent and Trademark Office*